United States Patent
Kamei et al.

(10) Patent No.: US 11,310,633 B2
(45) Date of Patent: Apr. 19, 2022

(54) MULTICAST CONTROL DEVICE, MULTICAST CONTROL METHOD, AND NON-TRANSITORY COMPUTER READABLE MEDIUM

(71) Applicant: NEC CORPORATION, Tokyo (JP)

(72) Inventors: Akira Kamei, Tokyo (JP); Toru Yamada, Tokyo (JP); Kyoji Hirata, Tokyo (JP); Masahiro Serizawa, Tokyo (JP); Satoshi Hasegawa, Tokyo (JP); Masashi Shimoma, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/981,023

(22) PCT Filed: Feb. 8, 2019

(86) PCT No.: PCT/JP2019/004532
§ 371 (c)(1),
(2) Date: Sep. 15, 2020

(87) PCT Pub. No.: WO2019/176396
PCT Pub. Date: Sep. 19, 2019

(65) Prior Publication Data
US 2021/0051447 A1    Feb. 18, 2021

(30) Foreign Application Priority Data
Mar. 16, 2018    (JP) .............................. JP2018-050088

(51) Int. Cl.
*H04W 4/06* (2009.01)
*H04L 43/16* (2022.01)
*H04W 84/04* (2009.01)

(52) U.S. Cl.
CPC ............... *H04W 4/06* (2013.01); *H04L 43/16* (2013.01); *H04W 84/042* (2013.01)

(58) Field of Classification Search
CPC ................................. H04W 4/06; H04L 43/16
(Continued)

(56) References Cited

U.S. PATENT DOCUMENTS

| 2007/0105557 A1 | 5/2007 | Israelsson |
| 2013/0028118 A1* | 1/2013 | Cherian .............. H04W 72/005 370/252 |

(Continued)

FOREIGN PATENT DOCUMENTS

| JP | H08-213961 A | 8/1996 |
| JP | 2010-093480 A | 4/2010 |
| JP | 2013-545322 A | 12/2013 |

OTHER PUBLICATIONS

"3rd Generation Partnership Project; Technical Specification Group Services and System Aspects Multimedia Broadcast/Multicast Service (MBMS); Architecture and functional description (Release 15)", 3GPP TS 23.246 V15.0.0, Dec. 2017, pp. 1-77.

(Continued)

*Primary Examiner* — John J Lee
(74) *Attorney, Agent, or Firm* — Sughrue Mion, PLLC

(57) ABSTRACT

A multicast control device capable of reducing the distribution time of multicast data is provided. A multicast control device (10) according to the present disclosure includes a determination unit (11) configured to determine whether the number of communication terminals joining a multicast service exceeds a predetermined threshold, and a session control unit (12) configured to start a multicast session for a plurality of communication terminals joining the multicast service when it is determined that the number of communication terminals joining the multicast service exceeds the predetermined threshold.

9 Claims, 8 Drawing Sheets

(58) Field of Classification Search
USPC .... 370/312, 252, 248; 455/3.06, 452.1, 509, 455/414.1, 3.01
See application file for complete search history.

(56) References Cited

U.S. PATENT DOCUMENTS

| | | | | |
|---|---|---|---|---|
| 2013/0294320 A1* | 11/2013 | Jactat | ................ | H04W 72/005 |
| | | | | 370/312 |
| 2013/0294321 A1* | 11/2013 | Wang | ................ | H04W 72/005 |
| | | | | 370/312 |
| 2015/0092569 A1* | 4/2015 | Venkataraman | ........ | H04L 45/50 |
| | | | | 370/248 |

OTHER PUBLICATIONS

International Search Report for PCT/JP2019/004532 dated Apr. 2, 2019 [PCT/ISA/210].
Written Opinion for PCT/JP2019/004532 dated Apr. 2, 2019 [PCT/ISA/237].
Japanese Office Action for JP Application No. 2020-505680 dated Sep. 7, 2021 with English Translation.

* cited by examiner

MULTICAST CONTROL DEVICE, MULTICAST CONTROL METHOD, AND NON-TRANSITORY COMPUTER READABLE MEDIUM

CROSS REFERENCE TO RELATED APPLICATIONS

This application is a National Stage of International Application No. PCT/JP2019/004532 filed Feb. 8, 2019, claiming priority based on Japanese Patent Application No. 2018-050088 filed Mar. 16, 2018.

TECHNICAL FIELD

The present invention relates to a multicast control device, a multicast control method, and a program.

BACKGROUND ART

A rapid increase in IoT (Internet of Things) devices connected to a network is forecast in years to come. It is therefore important to efficiently perform firmware update or security software upgrade for IoT devices.

In order to efficiently perform firmware update or the like, data distribution using multicast communication to a plurality of IoT devices is studied, for example. Non Patent Literature 1 discloses specifications related to MBMS (Multimedia Broadcast and Multicast Service) defined by 3GPP (3rd Generation Partnership Project). The MBMS is a service related to broadcast and multicast performed in a mobile network. To be specific, Non Patent Literature 1 discloses processing in each phase defined in a multicast mode.

For example, Non Patent Literature 1 describes that a multicast session is started after Joining of a UE (User Equipment) to a multicast service.

CITATION LIST

Non Patent Literature

NPL1: 3GPP TS 23.246 V15.0.0 (2017-12)

SUMMARY OF INVENTION

Technical Problem

Non Patent Literature 1 describes that multicast data is transmitted also to a UE that is Joining a multicast service after a multicast session is started. Such a UE receives the multicast data in the middle of the multicast session, and therefore it cannot receive all of the necessary multicast data. Thus, this UE receives the missing data in the next multicast session. In other words, the UE that is Joining in the middle of the multicast session receives the multicast data across a plurality of multicast sessions.

This consequently increases the distribution time of the multicast data in a control device that controls the multicast service located on a network side, which increases communication resources allocated to the multicast service.

In view of the foregoing, an object of the present disclosure is to provide a multicast control device, a multicast control method, and a program capable of reducing the distribution time of multicast data.

Solution to Problem

A multicast control device according to a first aspect of the present disclosure includes a determination unit configured to determine whether the number of communication terminals joining a multicast service exceeds a predetermined threshold, and a session control unit configured to start a multicast session for a plurality of communication terminals joining the multicast service when it is determined that the number of communication terminals joining the multicast service exceeds the predetermined threshold.

A multicast control method according to a second aspect of the present disclosure includes determining whether the number of communication terminals joining a multicast service exceeds a predetermined threshold, and starting a multicast session for a plurality of communication terminals joining the multicast service when it is determined that the number of communication terminals joining the multicast service exceeds the predetermined threshold.

A program according to a third aspect of the present disclosure causes a computer to perform determining whether the number of communication terminals joining a multicast service exceeds a predetermined threshold, and starting a multicast session for a plurality of communication terminals joining the multicast service when it is determined that the number of communication terminals joining the multicast service exceeds the predetermined threshold.

Advantageous Effects of Invention

According to the present disclosure, there are provided a multicast control device, a multicast control method, and a program capable of reducing the distribution time of multicast data.

DESCRIPTION OF EMBODIMENTS

First Example Embodiment

Figure 1:
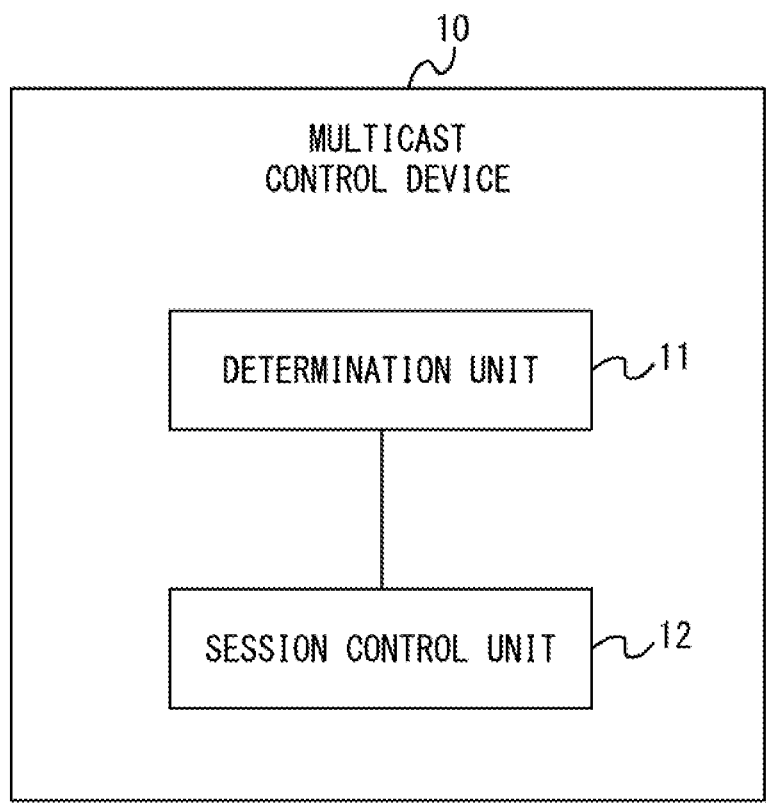
FIG. 1 is a block diagram of a multicast control device according to a first example embodiment.

Example embodiments of the present invention are described hereinafter with reference to the drawings. First, a configuration example of a multicast control device 10 according to a first example embodiment is described with reference to FIG. 1. The multicast control device 10 may be a computer device that operates when a processor executes a program stored in a memory.

The multicast control device 10 includes a determination unit 11 and a session control unit 12. The determination unit 11 and the session control unit 12 may be software or module whose processing is performed when a processor executes a program stored in a memory. Alternatively, the determination unit 11 and the session control unit 12 may be hardware such as a chip or a circuit.

The determination unit 11 determines whether the number of communication terminals joining a multicast service exceeds a predetermined threshold or not. The communication terminal may be a cellular phone terminal, a smart phone terminal, an IoT terminal, an MTC (Machine Type Communication) terminal, and so on, for example. The communication terminal may be a computer device that operates when a processor executes a program stored in a memory. Further, the communication terminal may be a UE (User Equipment), which is a general term for communication terminals in 3GPP.

The multicast service is a service that simultaneously distributes data to a plurality of communication terminals that are joining this multicast service. The multicast service may be MBMS (Multimedia Broadcast and Multicast Service) defined by 3GPP, for example. Further, the multicast service is implemented by using an MBMS bearer service and an MBMS user service.

The predetermined threshold may be a value entered by an administrator who administrates the multicast control device 10. Further, the predetermined threshold may be changed depending on the type of data to be distributed by the multicast service. The data may be data required for the update of firmware, OS (Operating System) and so on of each communication terminal, for example. Alternatively, the data may be data required for the update of an application such as security software.

When it is determined that the number of communication terminals joining the multicast service exceeds a predetermined threshold, the session control unit 12 starts a multicast session for the plurality of communication terminals joining the multicast service. The session control unit 12 controls the timing of starting a multicast session. The multicast session includes a period of distributing data and a preparation period for distributing data, for example. The multicast control device 10 distributes data required for update processing in a communication terminal in one session, for example.

As described above, the multicast control device 10 can start a multicast session when the number of communication terminals joining a multicast service exceeds a threshold. The plurality of communication terminals can thereby receive all of the necessary data in one session because the multicast session is started after joining the multicast service. As a result, the multicast control device 10 is capable of reducing the number of multicast sessions to be set for distributing data.

Second Example Embodiment

Figure 2:
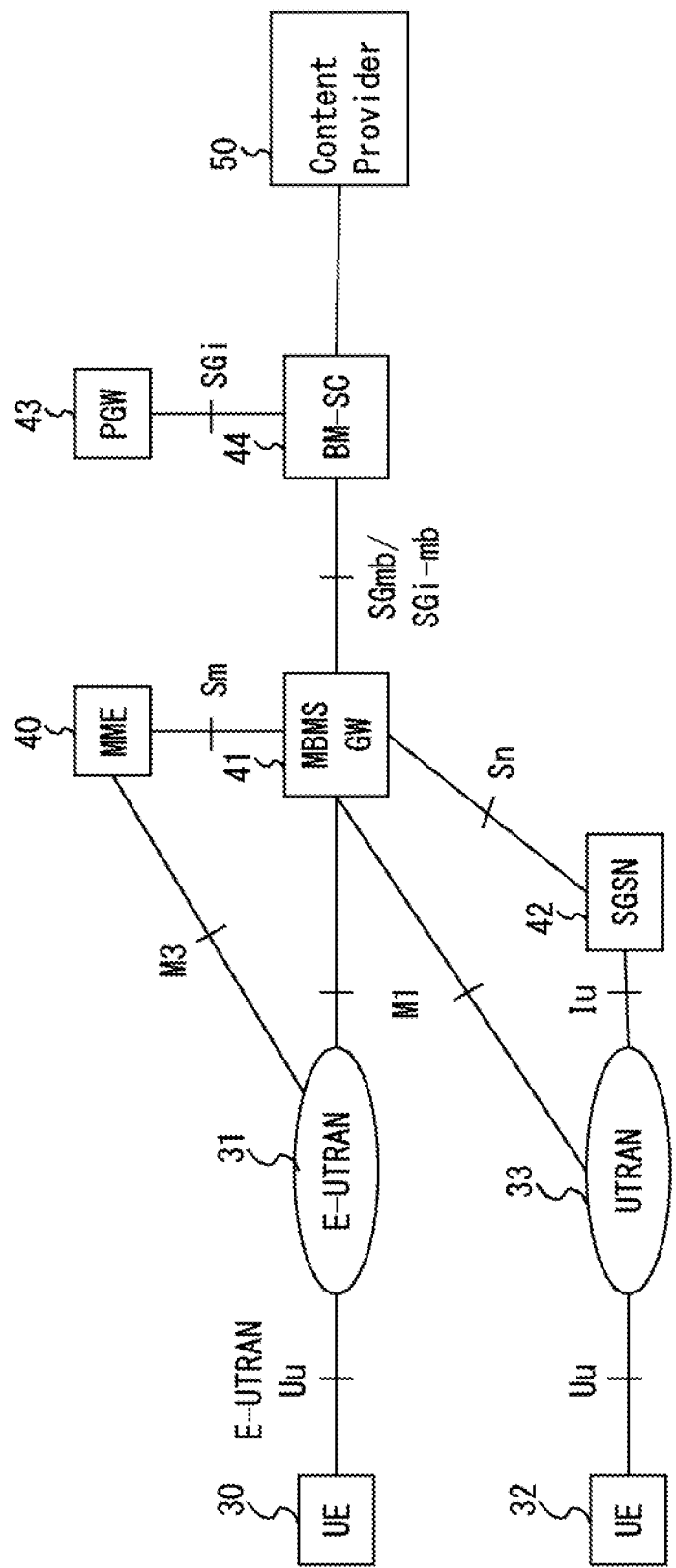
FIG. 2 is a block diagram of a communication system according to a second example embodiment.

A configuration example of a communication system according to a second example embodiment is described hereinafter with reference to FIG. 2. The communication system in FIG. 2 shows an MBMS architecture in 3GPP.

The communication system in FIG. 2 includes a UE (User Equipment) 30, an E-UTRAN (Evolved-Universal Mobile Telecommunications System Terrestrial Radio Access Network) 31, a UE 32, a UTRAN 33, an MME (Mobility Management Entity) 40, an MBMS-GW (MBMS-Gateway) 41, an SGSN (Serving General Packet Radio Service Support Node) 42, a PGW 43, a BM-SC (Broadcast Multicast Service Centre) entity 44 (which is referred to hereinafter as BM-SC 44), and a Content Provider 50. The content Provider 50 shows an external server device. The components, other than the Content Provider 50, of the communication system in FIG. 2 constitute an EPS (Evolved Packet System). The UE may be replaced with an MS (Mobile Station).

The E-UTRAN 31 is a RAN that uses LTE (Long Term Evolution) as a wireless access system. The UE 30 is a wireless terminal that performs wireless communication using the LTE. The UTRAN 33 is a RAN that uses a 3G wireless system as a wireless access system. The UE 32 is a wireless terminal that performs wireless communication using the 3G wireless system.

The MME 40 and the SGSN 42 are node devices that perform session management and mobility management related to UEs. The MBMS-GW 41 is a gateway that distributes data by using broadcast communication to the UE 30 and the UE 32 through the E-UTRAN 31 and the UTRAN 33. The BM-SC 44 transmits content data transmitted from the Content Provider 50 to the MBMS-GW 41.

An E-UTRAN Uu reference point is defined between the UE 30 and the E-UTRAN 31. A Uu reference point is defined between the UE 32 and the UTRAN 33. An M3 reference point is defined between the E-UTRAN 31 and the MME 40. An Iu reference point is defined between the UTRAN 33 and the SGSN 42. An M1 reference point is defined between the E-UTRAN 31, the UTRAN 33 and the MBMS-GW 41. An Sm reference point is defined between the MME 40 and the MBMS-GW 41. An Sn reference point is defined between the SGSN 42 and the MBMS-GW 41. SGmb and SGi-mb reference points are defined between the MBMS-GW 41 and the BM-SC 44. An SGi reference point is defined between the BM-SC 44 and the PGW 43.

Figure 3:
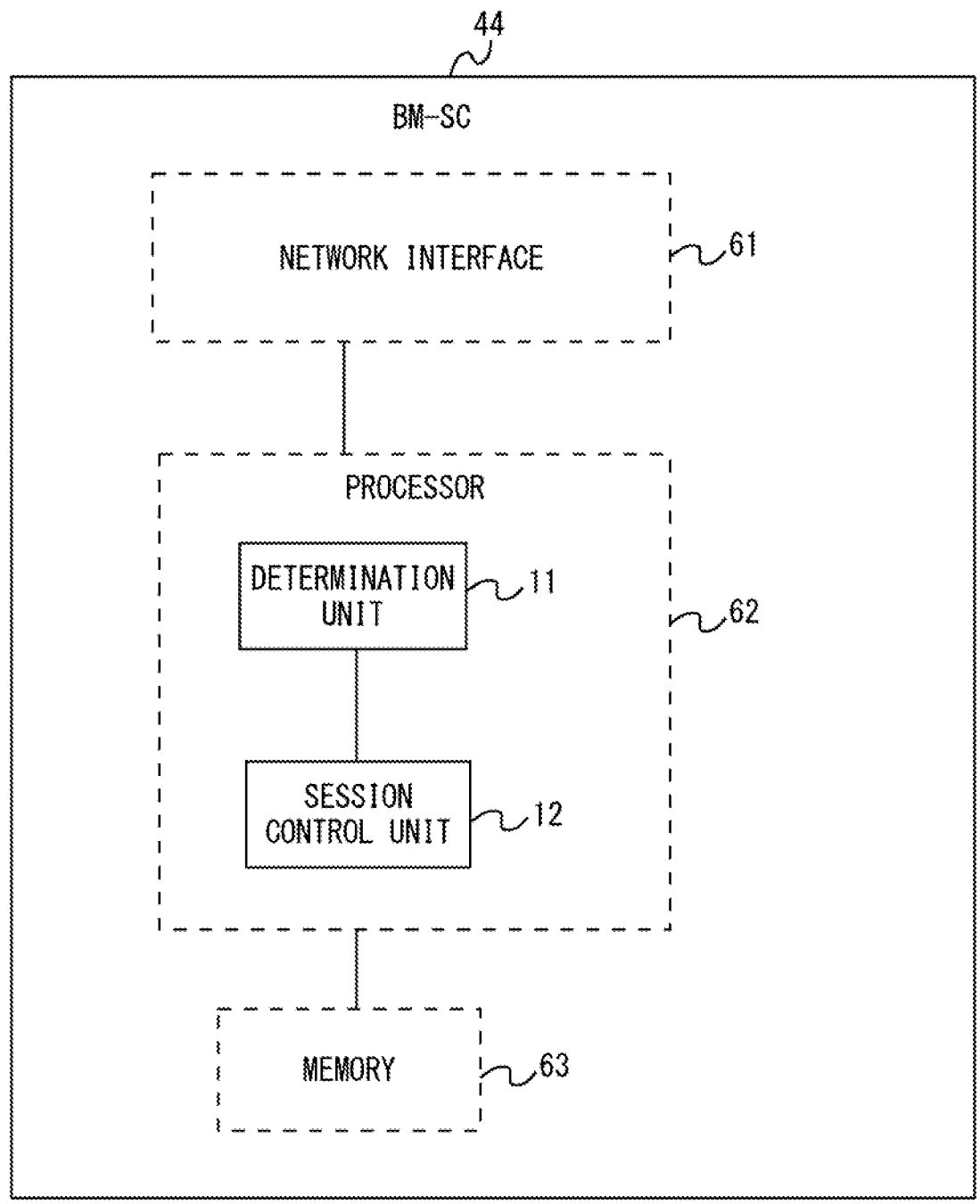
FIG. 3 is a block diagram of a BM-SC according to the second example embodiment.

A configuration example of the BM-SC 44 according to the second example embodiment is described hereinafter with reference to FIG. 3. The BM-SC 44 includes a network interface 61, a processor 62, and a memory 63. The network interface 61 may include a baseband processor that performs digital baseband signal processing. Alternatively, the network interface 61 may include a network interface card (NIC) compliant with IEEE 802.3 series.

The processor 62 reads software (computer program) from the memory 63 and performs processing which is described hereinafter with reference to flowcharts and the like. The processor 62 may be a microprocessor, an MPU (Micro Processing Unit) or a CPU (Central Processing Unit), for example. The processor 62 may include a plurality of processors.

The memory 63 is a combination of a volatile memory and a nonvolatile memory. The memory 63 may include a storage that is placed apart from the processor 62. In this case, the processor 62 may access the memory 63 through an I/O interface, which is not shown. The processor 62 is used to perform the functions or processing in the determination unit 11 and the session control unit 12 of FIG. 1.

The memory 63 is used to store software or a group of software modules. The processor 62 reads and runs the software or the group of software modules from the memory 63.

The overview of a multicast session control process performed in the BM-SC 44 is described hereinafter with reference to FIG. 4.

Figure 4:
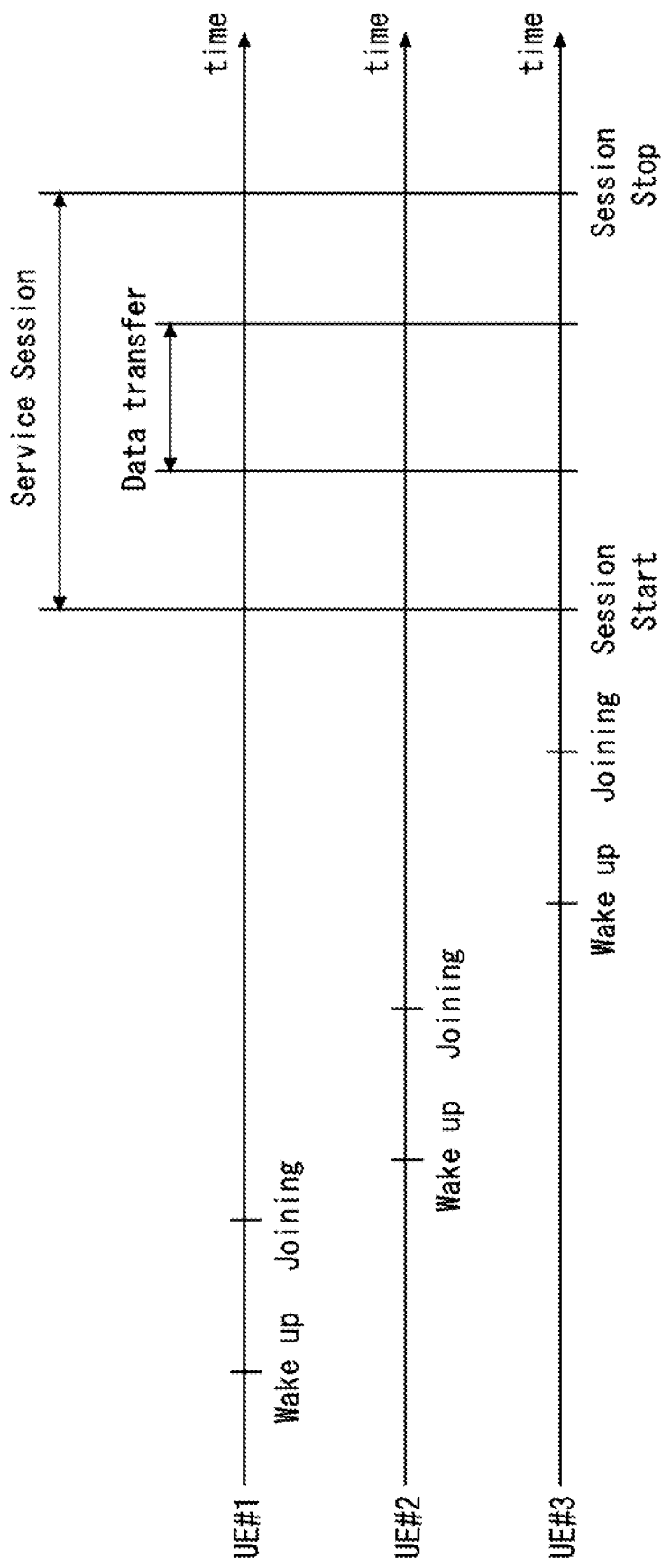
FIG. 4 is a view showing the overview of a multicast session control process performed in the BM-SC according to the second example embodiment.

The horizontal axis of FIG. 4 indicates the passage of time. Wake Up indicates timing when each UE starts receiving data in DRX (Discontinuous Reception) or eDRX (extended DRX). In other words, Wake Up indicates timing to start discontinuous reception. A period of time during which a UE does not receive data may be called a sleep time. eDRX has a longer sleep time than DRX. Thus, a UE that uses eDRX achieves lower power consumption than a UE that uses DRX.

Joining indicates timing when each UE joins a multicast service. For example, timing when an application related to a multicast service is activated may be timing of Joining. Alternatively, Joining may be timing that is predetermined in each UE as timing to join a multicast service. The timing predetermined as timing to join a multicast service may be set as several seconds or several minutes after Wake Up, for example.

Session Start indicates timing when a multicast session starts. Session Stop indicates timing when a multicast session stops. A period of time from Session Start to Session Stop is Service Session. Data transfer indicates a period of time during which data is distributed to each UE. Data transfer is included in Service Session. For example, it is assumed that update data required for each UE to update an application or the like is distributed in Data transfer. Further, a period of time from Session Start to Data transfer may be a preparation period before the start of data distribution, for example.

In FIG. 4, it is assumed that a threshold for the number of UEs to be determined when starting a multicast session is set to 2. Specifically, the multicast session is started when the number of UEs joining a multicast service exceeds 2 and reaches 3 or more. FIG. 4 shows that a UE #1, a UE #2 and a UE #3 sequentially join the multicast service. It also shows that the multicast session is started after the UE #3 joins the multicast service.

Thus, the BM-SC 44 does not start the multicast session at the point of time when the UE #1 and the UE #2 join the multicast service. The BM-SC 44 starts the multicast session after the UE #3 joins the multicast service. The UE #1, the UE #2 and the UE #3 can thereby receive all of the necessary data in one Service Session.

Figure 5:
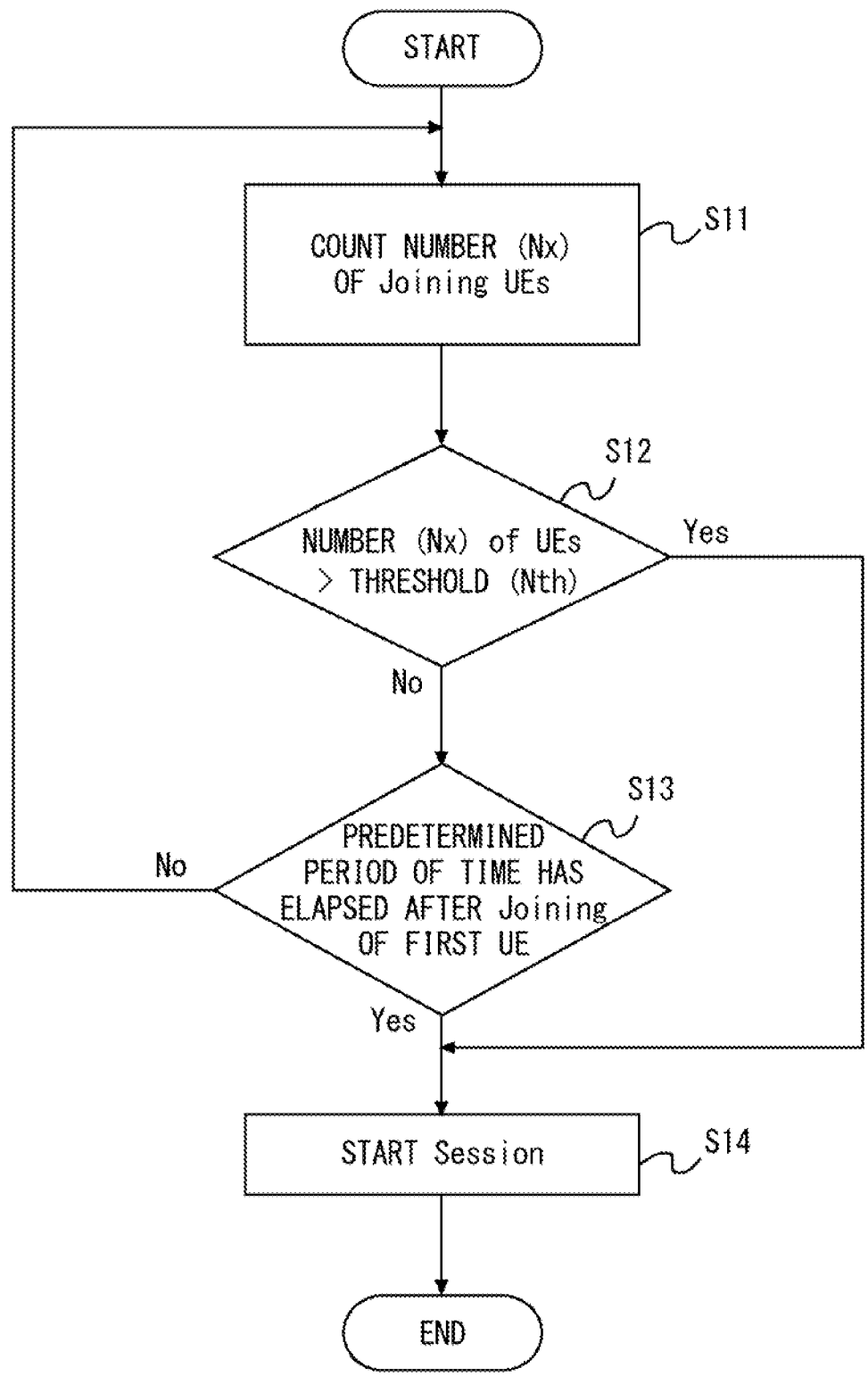
FIG. 5 is a view showing the flow of a multicast session start process in the BM-SC according to the second example embodiment.

The flow of a multicast session start process in the BM-SC 44 according to the second example embodiment is described hereinafter with reference to FIG. 5.

First, the determination unit 11 counts the number (Nx) of UEs that is Joining the multicast service (S11). For example, the Joining UE may send a message indicating Joining to the BM-SC 44 by using control data or user data. The control data may be called C(Control)-Plane data. The user data may be called U(User)-Plane data. The determination unit 11 may count the number of Joining UEs by counting messages sent from the UEs. The determination unit 11 may include a counter and reflect the counted number of UEs on the counter. Stated differently, the determination unit 11 counts the number of UEs that have activated an application related to the multicast service.

The determination unit 11 may count the number of Joining UEs at predetermined periodical timing. Alternatively, the determination unit 11 may count the number of Joining UEs at timing when a predetermined period of time has elapsed after Joining of the first UE to the multicast service. Alternatively, the determination unit 11 may count the number of Joining UEs at timing when a predetermined period of time has elapsed after Joining of the last UE to the multicast service.

Next, the determination unit 11 determines whether the number (Nx) of Joining UEs exceeds a predetermined threshold (Nth) or not (S12). When it is determined that Nx exceeds Nth, the session control unit 12 starts a multicast session to distribute data (S14).

In Step S12, when it is determined that Nx does not exceed Nth, the session control unit 12 determines whether a predetermined period of time has elapsed after Joining of the first UE to the multicast service or not (S13). The first UE is the UE #1 in FIG. 4, for example. Further, the first UE may be a UE that joins the multicast service earliest among the UEs joining the multicast service after the previous multicast session is started. For example, the UE that joins the multicast service first after Session Start may be the first UE.

The predetermined period of time may be a value that is arbitrarily determined by an administrator of the BM-SC 44. Alternatively, the predetermined period of time may be determined based on a period between a sleep time and a sleep time in a UE that performs communication using DRX or eDRX. Specifically, the predetermined period of time may be determined based on a period which is outside the sleep period and during which the first UE can perform communication continuously. For example, the predetermined period of time may be an interval of time within a period between a sleep time and a sleep time. In other words, the predetermined period of time may be a period from the end of a sleep time to the timing before the start of the next sleep time.

When the session control unit 12 determines that the predetermined period of time has elapsed after Joining of the first UE, it starts the multicast session (S14). When, on the other hand, the session control unit 12 determines that the predetermined period of time has not elapsed after Joining of the first UE, it repeats the processing after Step S11. Further, the determination unit 11 may clear the value of the counter when the session control unit 12 starts the multicast session. After clearing the value of the counter, the determination unit 11 counts the number of UEs joining the multicast service again.

It is assumed that timing of the start of the next sleep period in the UE #2 in FIG. 4 is earlier than timing of the start of the next sleep period in the UE #1. In this case, the session control unit 12 may determine the predetermined period of time based on a period between a sleep time and a sleep time in the UE #2, instead of the UE #1, which is the first Joining UE, in Step S13.

As described above, the BM-SC 44 can start a multicast session when the number of UEs joining a multicast service exceeds a threshold. A plurality of UEs can thereby receive the same data in the same session. The BM-SC 44 can thereby distribute the same data to the UEs joining the multicast service before the start of the multicast session, and therefore does not need to start the multicast session again. This allows reduction of the number of Service Sessions for the BM-SC 44 to distribute the same data, which reduces the processing load in the BM-SC 44.

Further, even when the number of UEs joining a multicast service does not exceed a threshold, the BM-SC 44 starts a multicast session after the lapse of a predetermined period of time in order to distribute data to the UEs joining the multicast service. The UE joining the multicast service can thereby receive the distributed data regardless of the joining situation of the other UEs to the multicast service.

Third Example Embodiment

Figure 6:
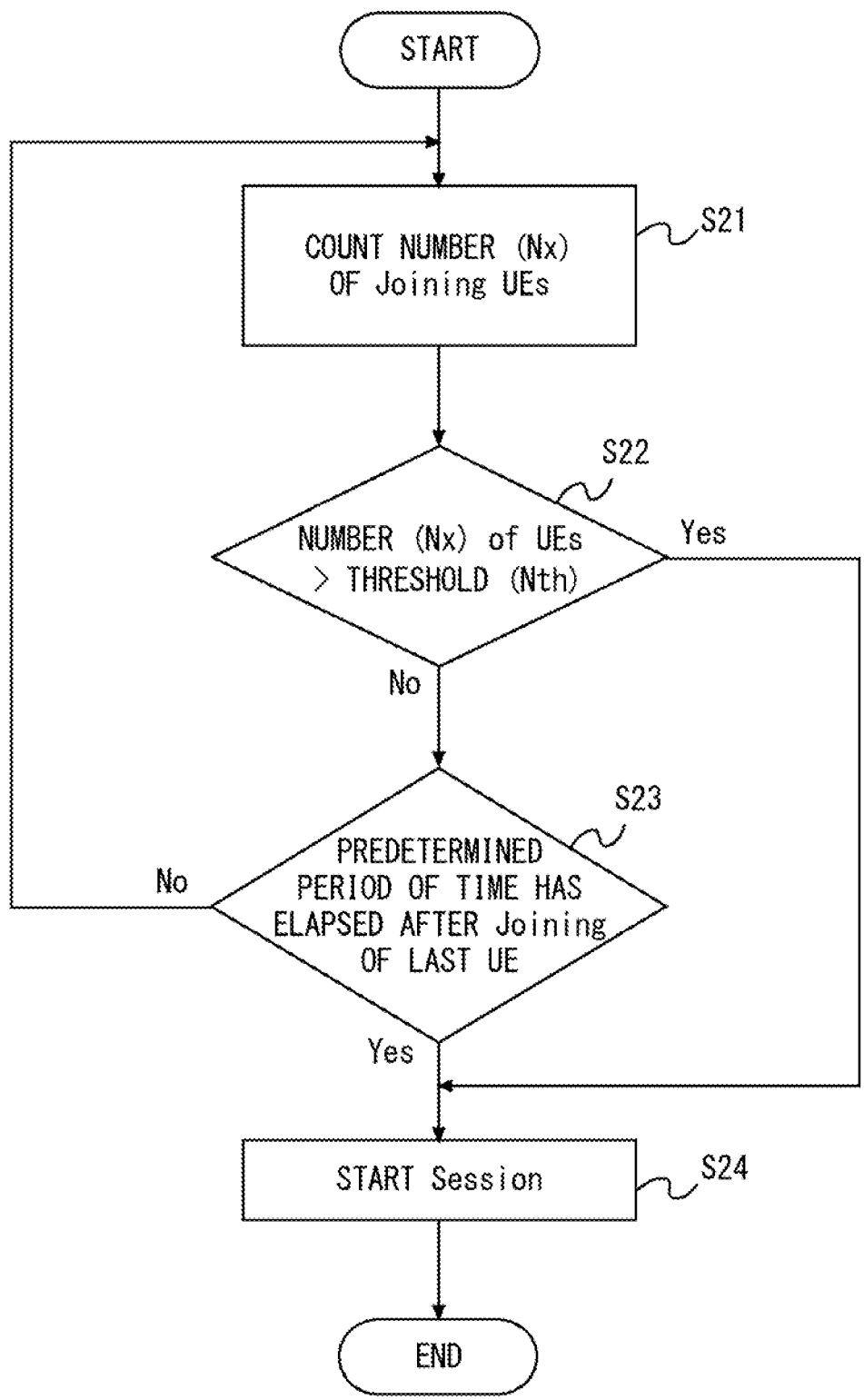
FIG. 6 is a view showing the flow of a multicast session start process in a BM-SC according to a third example embodiment.

The flow of a multicast session start process in the BM-SC 44 according to the third example embodiment is described hereinafter with reference to FIG. 6. Steps S21, S22 and S24 are the same as Steps S11, S12 and S14 in FIG. 5, and therefore detailed description thereof is omitted.

In Step S23, the session control unit 12 determines whether a predetermined period of time has elapsed after Joining of the last UE to the multicast service or not (S23). The last UE is a UE that joins the multicast service latest before the number (Nx) of Joining UEs exceeds the threshold (Nth). In FIG. 4, when the threshold is set to 2 and the UE #3 has not joined the multicast service, the last UE may be the UE #2. Alternatively, when the threshold is set to 3, the last UE may be the UE #3.

The predetermined period of time may be the average of the interval of the UEs having joined the multicast service in the past. Alternatively, the predetermined period of time may be the maximum value or the minimum value of the interval of occurrence of the UEs having joined the multicast service in the past. The session control unit 12 starts the multicast session when the predetermined period of time has elapsed after Joining of the last UE (S24).

For example, it is assumed that a UE $\#_n$, a UE $\#_{n+1}$, and a UE $\#_{n+2}$ are joining the multicast service before the number of UEs joining the multicast service exceeds a threshold. It is assumed that the UE $\#_n$ has joined the multicast service earliest, and the UE $\#_{n+2}$ has joined the multicast service latest. The threshold is 3 or more in this example.

It is also assumed that a difference between Joining timing of the UE $\#_n$ and Joining timing of UE $\#_{n+1}$ is $T_n$. Further, a difference between Joining timing of the UE $\#_{n+1}$ and Joining timing of UE $\#_{n+2}$ is $T_{n+1}$. In this case, the session control unit 12 may determine whether $(T_n+T_{n+1})/2$ has elapsed from Joining of UE $\#_{n+2}$. Alternatively, the session control unit 12 may determine whether $T_n$ has elapsed or $T_{n+1}$ has elapsed from Joining of UE $\#_{n+2}$.

As described above, the BM-SC 44 according to the third example embodiment can start a multicast session after the lapse of a predetermined period of time from joining of the last UE to a multicast service, before the number of UEs joining the multicast service exceeds a threshold. The predetermined period of time in third example embodiment is determined based on the interval of joining of the UEs to the multicast service in the past. In other words, the predetermined period of time in third example embodiment is the estimated time until the UE joins the multicast service next time. When the estimated time until joining of the next UE has elapsed after the last UE has joined the multicast service, the BM-SC 44 assumes that substantially all of the UEs have joined the multicast service. Thus, the BM-SC 44 can start a multicast session after all of the possible UEs have joined the multicast service.

Fourth Example Embodiment

The flow of a session start process in the BM-SC 44 according to the fourth example embodiment is described hereinafter with reference to FIG. 7.

First, the determination unit 11 counts the number of Joining UEs (S31). For example, the Joining UEs may send a message indicating Joining to the BM-SC 44 by using control data or user data. The control data may be called C(Control)-Plane data. The user data may be called U(User)-Plane data. The determination unit 11 may count the number of Joining UEs by counting messages sent from the UEs. The determination unit 11 may include a counter and reflect the counted number of UEs on the counter. Stated differently, the determination unit 11 counts the number of UEs that have activated an application related to the multicast service.

The determination unit 11 may count the number of Joining UEs at predetermined periodical timing. Alternatively, the determination unit 11 may count the number of Joining UEs at timing when a predetermined period of time has elapsed after Joining of the first UE to the multicast service. Alternatively, the determination unit 11 may count the number of Joining UEs at timing when a predetermined period of time has elapsed after Joining of the last UE to the multicast service.

Next, the determination unit 11 determines whether the number (Nx) of Joining UEs exceeds a predetermined threshold (Nth) or not (S32). When it is determined that Nx exceeds Nth, the session control unit 12 starts a multicast session to distribute data (S33). When, on the other hand, it is determined that Nx does not exceed Nth, the session control unit 12 starts a unicast session to distribute data.

Thus, the session control unit 12 determines whether to start a multicast session or start a unicast session based on the number of UEs joining the multicast service in Step S32.

Further, in Step S34, the session control unit 12 transmits data by using a unicast session to a UE that desires or intends to distribute data using a multicast service. Thus, the session control unit 12 performs processing related to establishment of a unicast session with each of one or more UEs joining the multicast service in Step S34.

Further, when the session control unit 12 detects that Nx exceeds Nth after starting a unicast session, it may distribute data by switching the session to a multicast session. Specifically, the session control unit 12 may distribute data by using a multicast session to the UE, to which it has transmitted data by using a unicast session, upon detecting that Nx exceeds Nth.

Figure 7:
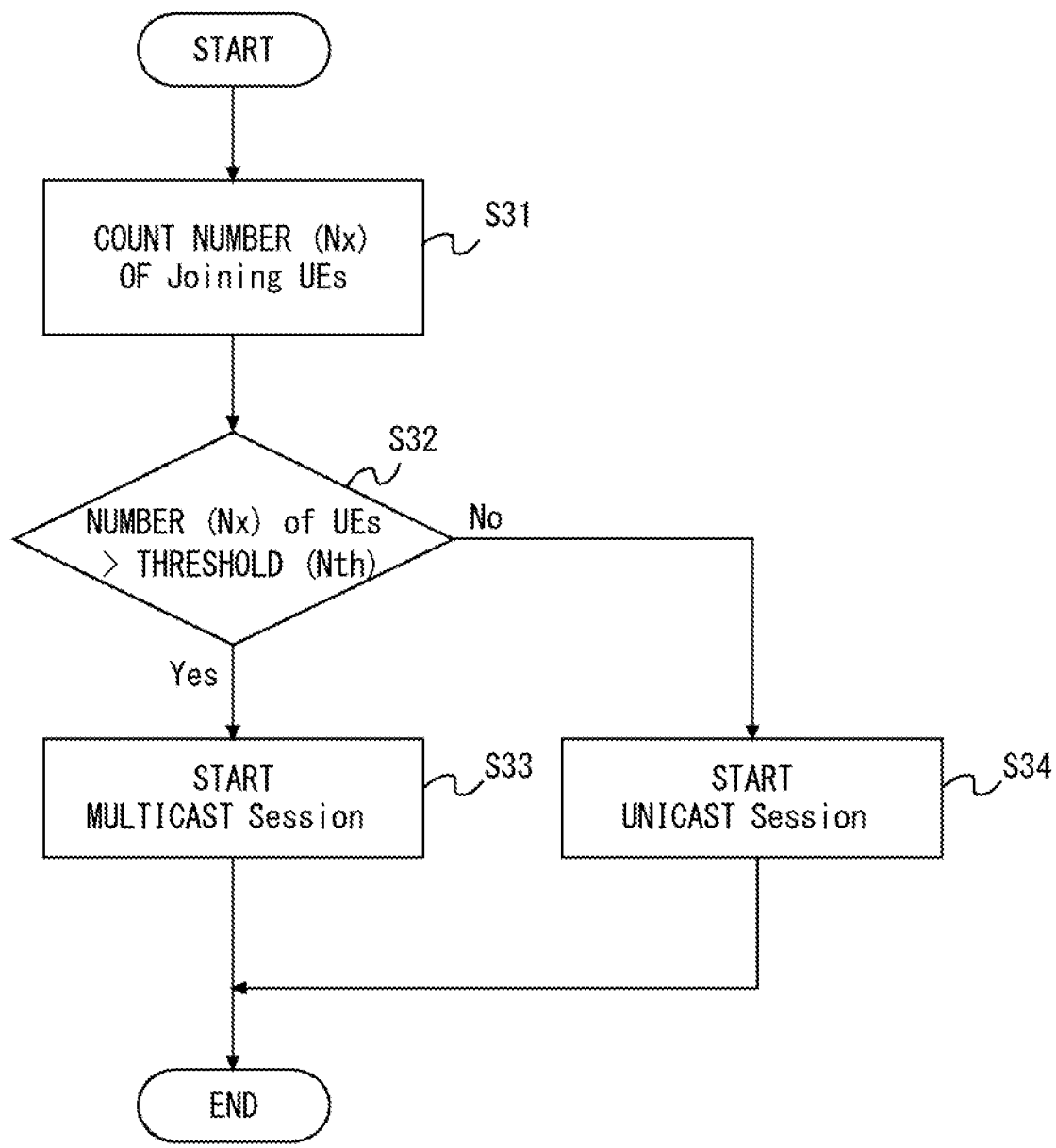
FIG. 7 is a view showing the flow of a multicast session start process in a BM-SC according to a fourth example embodiment.
Figure 8:
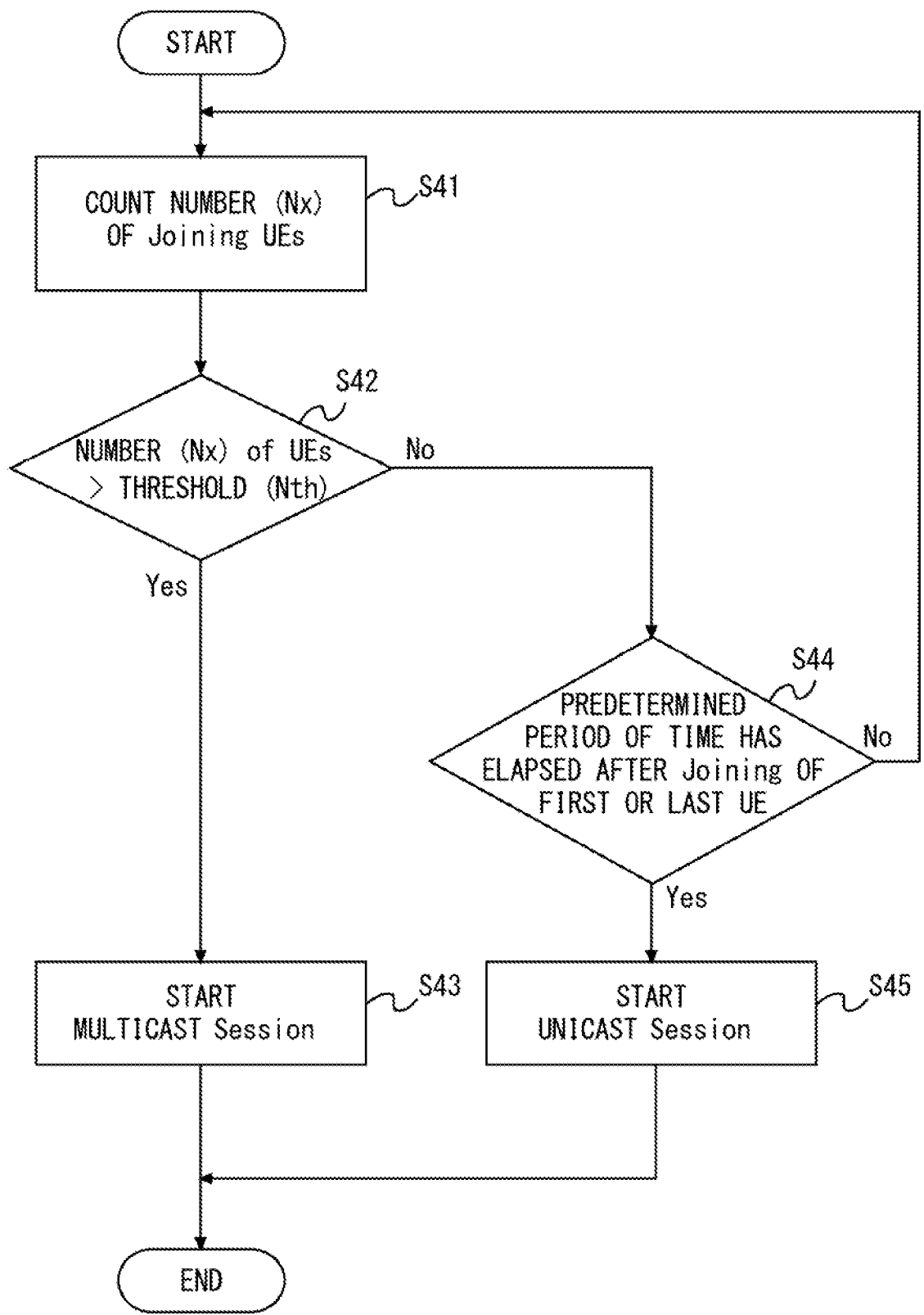
FIG. 8 is a view showing the flow of a multicast session start process in the BM-SC according to the fourth example embodiment.

The flow of a session start process in the BM-SC 44, which is different from that shown in FIG. 7, is described hereinafter with reference to FIG. 8. Steps S41 to S43 and S45 are the same as Steps S31 to S34 in FIG. 7, and therefore detailed description thereof is omitted.

In Step S42, when the session control unit 12 determines that Nx does not exceed Nth, it determines whether a predetermined period of time has elapsed after Joining of the first UE or the last UE to the multicast service (S44).

When the session control unit 12 determines that a predetermined period of time has elapsed after Joining of the first UE or the last UE to the multicast service, it starts a unicast session (S45). When, on the other hand, the session control unit 12 determines that a predetermined period of time has not elapsed after Joining of the first UE or the last UE to the multicast service, it repeats the processing after Step S41. In this manner, the process in FIG. 7 may be combined with the processes illustrated in FIGS. 5 and 6.

As described above, by performing the session start process according to the fourth example embodiment, the distribution time of multicast data decreases, which reduces communication resources allocated to the multicast service.

In the above-described example, the program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Note that the present disclosure is not limited to the above-described example embodiments and can be modified as appropriate without departing from the spirit and scope of the present disclosure. Further, the present disclosure may be implemented by combining the above-described example embodiments with one another.

The whole or part of the example embodiments disclosed above can be described as, but not limited to, the following supplementary notes.

(Supplementary Note 1)

1. A multicast control device comprising:
determination means for determining whether the number of communication terminals that have joined a multicast service exceeds a predetermined threshold; and
session control means for starting a multicast session for a plurality of communication terminals that have joined the multicast service when it is determined that the number of communication terminals that have joined the multicast service exceeds the predetermined threshold.

(Supplementary Note 2)

The multicast control device according to Supplementary Note 1, wherein, when it is determined that the number of communication terminals that have joined the multicast service does not exceed the predetermined threshold, the session control means starts at a specified timing a multicast session for at least one communication terminal that has joined the multicast service.

(Supplementary Note 3)

The multicast control device according to Supplementary Note 2, wherein the specified timing is after a lapse of a predetermined period of time from joining of a first communication terminal to the multicast service.

(Supplementary Note 4)

The multicast control device according to Supplementary Note 2, wherein,
an interval between the times of joining of communication terminals to the multicast service in the past is calculated, and
the specified timing is after a lapse of the calculated interval from the time of joining of the last communication terminal to the multicast service.

(Supplementary Note 5)

The multicast control device according to Supplementary Note 4, wherein the specified timing is any one of an average value, a maximum value, and a minimum value of the interval between the times of joining of the communication terminals to the multicast service in the past.

(Supplementary Note 6)

The multicast control device according to any one of Supplementary Notes 1 to 5, further comprising:
counting means for counting the number of communication terminals that have joined a multicast service,
wherein the determination means determines whether the counted number of communication terminals exceeds a predetermined threshold.

(Supplementary Note 7)

The multicast control device according to Supplementary Note 6, wherein the counting means clears the counted number of communication terminals when the session control means starts a multicast session.

(Supplementary Note 8)

The multicast control device according to Supplementary Note 6 or 7, wherein the counting means counts the number of communication terminals that have activated the multicast service.

(Supplementary Note 9)

The multicast control device according to any one of Supplementary Notes 1 to 8, wherein the multicast service uses an MBMS bearer service and an MBMS user service.

(Supplementary Note 10)

A multicast control method comprising:
determining whether the number of communication terminals that have joined a multicast service exceeds a predetermined threshold; and
starting a multicast session for a plurality of communication terminals that have joined the multicast service when it is determined that the number of communication terminals that have joined the multicast service exceeds the predetermined threshold.

(Supplementary Note 11)

A non-transitory computer readable medium storing a program causing a computer to perform:
determining whether the number of communication terminals that have joined a multicast service exceeds a predetermined threshold; and
starting a multicast session for a plurality of communication terminals that have joined the multicast service when it is determined that the number of communication terminals that have the multicast service exceeds the predetermined threshold.

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims.

This application is based upon and claims the benefit of priority from Japanese patent application No. 2018-050088 filed on Mar. 16, 2018, the disclosure of which is incorporated herein in its entirety by reference.

REFERENCE SIGNS LIST

10 MULTICAST CONTROL DEVICE
11 DETERMINATION UNIT
12 SESSION CONTROL UNIT
30 UE
31 E-UTRAN
32 UE
33 UTRAN
40 MME
41 MBMS-GW
42 SGSN
43 PGW
44 BM-SC
50 CONTENT PROVIDER
61 NETWORK INTERFACE
62 PROCESSOR
63 MEMORY

The invention claimed is:

1. A multicast control device comprising:
at least one memory storing instructions, and
at least one processor configured to execute the instructions to;
determine whether the number of communication terminals that have joined a multicast service exceeds a predetermined threshold; and start a multicast session for a plurality of communication terminals that have joined the multicast service when it is determined that the number of communication terminals that have joined the multicast service exceeds the predetermined threshold, wherein, when it is determined that the number of communication terminals that have joined the multicast service does not exceed the predetermined threshold, the at least one processor is further configured to execute the instructions to start at a specified timing a multicast session for at least one communication terminal that has joined the multicast service, and wherein,
an interval between the times of joining of communication terminals to the multicast service in the past is calculated, and the specified timing is after a lapse of the calculated interval from the time of joining of the last communication terminal to the multicast service.

2. The multicast control device according to claim 1, wherein the specified timing is after a lapse of a predetermined period of time from joining of a first communication terminal to the multicast service.

3. The multicast control device according to claim 1, wherein the specified timing is any one of an average value, a maximum value, and a minimum value of the interval between the times of joining of the communication terminals to the multicast service in the past.

4. The multicast control device according to claim 1, wherein the at least one processor is further configured to execute the instructions to
count the number of communication terminals that have joined a multicast service, and
determine whether the counted number of communication terminals exceeds a predetermined threshold.

5. The multicast control device according to claim 4, wherein the at least one processor is further configured to execute the instructions to clear the counted number of communication terminals when a multicast session is started.

6. The multicast control device according to claim 4, wherein the counting means counts the number of communication terminals that have activated the multicast service.

7. The multicast control device according to claim 1, wherein the multicast service uses an MBMS bearer service and an MBMS user service.

8. A multicast control method comprising:
determining whether the number of communication terminals that have joined a multicast service exceeds a predetermined threshold; and
starting a multicast session for a plurality of communication terminals that have joined the multicast service when it is determined that the number of communication terminals that have joined the multicast service exceeds the predetermined threshold wherein, when it is determined that the number of communication terminals that have joined the multicast service does not exceed the predetermined threshold, starting at a specified timing a multicast session for at least one communication terminal that has joined the multicast service, and wherein,
an interval between the times of joining of communication terminals to the multicast service in the past is calculated, and the specified timing is after a lapse of the calculated interval from the time of joining of the last communication terminal to the multicast service.

9. A non-transitory computer readable medium storing a program causing a computer to perform:
determining whether the number of communication terminals that have joined a multicast service exceeds a predetermined threshold; and
starting a multicast session for a plurality of communication terminals that have joined the multicast service when it is determined that the number of communication terminals that have the multicast service exceeds the predetermined threshold wherein, when it is determined that the number of communication terminals that have joined the multicast service does not exceed the predetermined threshold, starting at a specified timing a multicast session for at least one communication terminal that has joined the multicast service, and wherein,
an interval between the times of joining of communication terminals to the multicast service in the past is calculated, and the specified timing is after a lapse of the calculated interval from the time of joining of the last communication terminal to the multicast service.

* * * * *